(12) United States Patent
Daum (10) Patent No.: US 10,680,270 B2
(45) Date of Patent: *Jun. 9, 2020

(54) FUEL CELL INK TRACE INTERCONNECT

(71) Applicant: LG Electronics, Inc., Seoul (KR)

(72) Inventor: Edward Daum, Minerva, OH (US)

(73) Assignee: LG ELECTRONICS, INC., Seoul (KR)

( * ) Notice: Subject to any disclaimer, the term of this patent is extended or adjusted under 35 U.S.C. 154(b) by 203 days.

This patent is subject to a terminal disclaimer.

(21) Appl. No.: 15/816,951

(22) Filed: Nov. 17, 2017

(65) Prior Publication Data
US 2019/0157706 A1    May 23, 2019

(51) Int. Cl.
| | | |
|---|---|---|
| *H01M 8/2428* | (2016.01) | |
| *H01M 8/0206* | (2016.01) | |
| *H01M 8/0208* | (2016.01) | |
| *H01M 8/0215* | (2016.01) | |
| *H01M 8/0282* | (2016.01) | |
| *H01M 8/1246* | (2016.01) | |
| *H01M 8/249* | (2016.01) | |
| *H01M 8/0226* | (2016.01) | |
| *H01M 8/0202* | (2016.01) | |
| *H01M 8/124* | (2016.01) | |

(52) U.S. Cl.
CPC ....... *H01M 8/2428* (2016.02); *H01M 8/0202* (2013.01); *H01M 8/0206* (2013.01); *H01M 8/0208* (2013.01); *H01M 8/0215* (2013.01); *H01M 8/0226* (2013.01); *H01M 8/0282* (2013.01); *H01M 8/1246* (2013.01); *H01M 8/249* (2013.01); *H01M 2008/1293* (2013.01)

(58) Field of Classification Search
CPC ............ H01M 8/2428; H01M 8/1253; H01M 2008/1293; H01M 8/0202; H01M 8/0206; H01M 8/0208; H01M 8/0215; H01M 8/0226; H01M 8/0282; H01M 8/1246; H01M 8/249
See application file for complete search history.

(56) References Cited

U.S. PATENT DOCUMENTS

| | | | | |
|---|---|---|---|---|
| 3,725,091 | A * | 4/1973 | Chyung | C03C 10/0027 428/539.5 |
| 2012/0107716 | A1 * | 5/2012 | Yoshida | H01M 8/0219 429/468 |
| 2012/0321983 | A1 * | 12/2012 | Goettler | H01M 2/20 429/468 |
| 2013/0122387 | A1 * | 5/2013 | Ono | H01M 8/02 429/456 |

* cited by examiner

*Primary Examiner* — Gregg Cantelmo
(74) *Attorney, Agent, or Firm* — Dentons US LLP (57) ABSTRACT

A fuel cell system is provided. The fuel cells system may be a segmented-in-series, solid-oxide fuel cell system. The system may comprise a fuel cell tube. The fuel cell tube may comprise a substrate having a first and second ends and a pair of generally planar opposing major surfaces extending between the ends. The fuel cell may further comprise a plurality of fuel disposed on one of the major surfaces proximate the first end of the substrate. The fuel cell tube may further comprise a sheet conductor. The sheet conductor may be electrically coupled to the plurality of fuel cells and may provide an electrical path from a location on one of the major surfaces to a location on the other the major surfaces proximate a first end of the substrate.

18 Claims, 11 Drawing Sheets

FUEL CELL INK TRACE INTERCONNECT

CROSS-REFERENCE TO RELATED APPLICATIONS

This application is related to concurrently filed and co-pending U.S. Application Ser. No. 15/816,948, filed Nov. 17, 2017, entitled "Multiple Fuel Cell Secondary Interconnect Bonding Pads and Wires,", with named inventors Gerry Agnew, the entirety of which is incorporated herein by reference.

TECHNICAL FIELD

The disclosure generally relates to fuel cells, such as solid oxide fuel cells.

BACKGROUND

Fuel cells, fuel cell systems, and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

The disclosure describes secondary interconnects for fuels cells, such as, for example, integrated planar solid oxide fuels cells.

In accordance with some embodiments of the present disclosure, a fuel cell system is provided. The fuel cells system may be a segmented-in-series, solid-oxide fuel cell system. The system may comprise a fuel cell tube. The fuel cell tube may comprise a substrate having a first and second ends and a pair of generally planar opposing major surfaces extending between the ends. The fuel cell may further comprise a plurality of fuel disposed on one of the major surfaces proximate the first end of the substrate. The fuel cell tube may further comprise a sheet conductor. The sheet conductor may be electrically coupled to the plurality of fuel cells and may provide an electrical path from a location on one of the major surfaces to a location on the other the major surfaces proximate a first end of the substrate.

In accordance with some embodiments of the present disclosure, a fuel cell system is provided. The fuel cell system may comprise a plurality of fuel cell tubes. Each tube may comprise a first and second end, a first and second surface, a plurality of fuel cells, and a first and second sheet conductor. The first and second surfaces may extend continuously between the first and second ends. Fuel cells may be disposed on the first and second surfaces. The fuel cells disposed on a surface may be electrically coupled to one another in series by one or more primary interconnects. The first and second sheet conductors may electrically couple the fuel cells on the first surface to the fuel cells on the second surface. The first sheet conductor may be located proximate to the first end of the tube; the second sheet conductor may be located proximate to the end of the tube. The first and second sheet conductors may be arranged such that the fuel cells disposed on the first surface are electrically coupled in parallel with the fuel cells disposed on the second surface.

In one aspect, the disclosure describes a fuel cell system that includes at least a first fuel cell tube and a second fuel cell tube. The first fuel cell tube includes a substrate, a fuel channel, and a first fuel cell formed on the substrate. The substrate separates the first fuel cell from the fuel channel. The first fuel cell includes a cathode, an electrolyte, an anode that is separated from the cathode by the electrolyte, a primary interconnect adjacent the anode, a cathode conductive layer separated from and electrically coupled to the anode of an adjacent fuel cell by the primary interconnect, and a secondary interconnect formed on and electrically coupled to the cathode conductive layer. The secondary interconnect is configured to electrically couple the first fuel cell tube and the second fuel cell tube. The cathode conductive layer is disposed between the secondary interconnect and the substrate.

In another aspect, the disclosure describes a fuel cell system that includes at least a first fuel cell tube and a second fuel cell tube. The first fuel cell tube includes a substrate, a fuel channel, and a first fuel cell formed on the substrate. The substrate separates the first fuel cell from the fuel channel. The first fuel cell includes a cathode, an electrolyte, an anode separated from the cathode by the electrolyte, a primary interconnect adjacent the anode, a secondary interconnect conductive layer that is separated from and electrically coupled to the anode by the primary interconnect and, and a secondary interconnect formed on and electrically coupled to the secondary interconnect conductive layer. The secondary interconnect is configured to electrically couple the first fuel cell tube and the second fuel cell tube. The secondary interconnect conductive layer is disposed between the secondary interconnect and the substrate.

In another aspect, the disclosure describes a fuel cell system that includes at least a first fuel cell tube and a second fuel cell tube. The first fuel cell tube includes a substrate, a fuel channel, and a first fuel cell formed on the substrate. The substrate separates the first fuel cell from the fuel channel. The first fuel cell includes a cathode, an electrolyte, an anode separated from the cathode by the electrolyte, a primary interconnect adjacent the anode, at least one of a cathode conductive layer or a secondary interconnect conductive layer separated from and electrically coupled to the anode by the primary interconnect, a conductive ink line formed on either the cathode conductive layer or the secondary interconnect conductive layer, a bonding pad disposed on the conductive ink line (also known as an ink line trace), a secondary interconnect formed on and electrically coupled to the bonding pad and configured to electrically couple the bonding pad of the first fuel cell tube and a bonding pad of the second fuel cell tube, and a dense barrier that separates both the conductive ink line and the bonding pad from the fuel channel and is configured to inhibit the migration of hydrogen from the fuel channel into the secondary interconnect.

BRIEF DESCRIPTION OF DRAWINGS

The description herein makes reference to the accompanying drawings wherein like reference numerals refer to like parts throughout the several views.

Referring to the drawings, some aspects of a non-limiting example of a fuel cell system in accordance with the present disclosure are schematically depicted. In the drawing, various features, components and interrelationships therebetween of aspects of an example of the present disclosure are depicted. However, the present disclosure is not limited to the particular examples presented and the components, features and interrelationships therebetween as are illustrated in the drawings and described herein.

DETAILED DESCRIPTION

As described above, examples of the present disclosure relate to example secondary interconnects for fuels cells, such as, e.g., solid oxide fuels cells (SOFCs) and integrated planar SOFCs. An electrochemical cell, such as a fuel cell, that converts chemical energy into electrical energy includes an anode, cathode and electrolyte as components. In some examples, each fuel cell may provide about one voltage depending on the fuel composition. Each cell may generate from about several hundred milliwatts to about several hundred watts of power depending on the fuel cell area, internal resistance, operating voltage, and the like.

To provide higher voltage and generate more power, individual cells may be connected in series through one or more interconnects. Interconnects may be a suitable electronic conductor that allows for the transport of electrons from one cell to another.

A primary interconnect may connect a first fuel cell to a second fuel cell. For example, in integrated planar SOFCs, all active fuel cell layers (e.g., anode, electrolyte, cathode, and primary interconnect) may be disposed on inert porous ceramic substrate, which may be a flat tube, circular tube, or the like. A plurality of fuel cells may be disposed on a substrate, wherein each individual fuel cell is connected to at least one adjacent fuel cell through a primary interconnect. This design—a plurality of fuel cells connected by primary interconnects—is also known as a segmented-in-series SOFC. If the substrate is flat tube, active cells may be deposited on both sides of the substrate.

To form relatively large fuel cell systems, for example, systems having a combined total power output (heat and electrical) of 1 kilowatt (kW) to 5 kW and distributed power generation systems having a total power output of 100 kW to 1 MW, or more, multiple fuel cell tubes may be connected to form a fuel cell bundle, multiple fuel cell bundles may be connected to form a fuel cell strip, multiple fuel cell strips may be connected to form a fuel cell block, and multiple fuel cell blocks may be connected to form a fuel cell generator module. Connecting multiple fuel cell tubes, fuel cell bundles, fuel cell strips, or fuel cell blocks may allow a fuel cell system to generate higher voltage and more power.

In integrated planar SOFCs, the connections between fuel cell tubes may be called a secondary interconnect. The term secondary interconnect may also refer to the connections between fuel cells on opposite sides of the same fuel cell tube. The connections between multiple fuel cell strips, multiple fuel cell bundles, or multiple fuel cell blocks may be called a tertiary interconnect.

Fuel cell systems may include a secondary interconnect at a location on an anode side of a fuel cell tube, for example, by bonding the secondary interconnect to an anode conductive layer (anode current collector, or ACC) with conductive bonding paste and covering the contact point with sealing glass. The sealing glass may provide a gastight barrier to separate the oxidant side (air side) and fuel side (hydrogen flow channel) of the fuel cell system.

As described below, some examples of the disclosure relate to the secondary interconnect connections between fuel cells tubes and connections between fuel cells on two or more sides of the same fuel cell tube.

Figure 1:
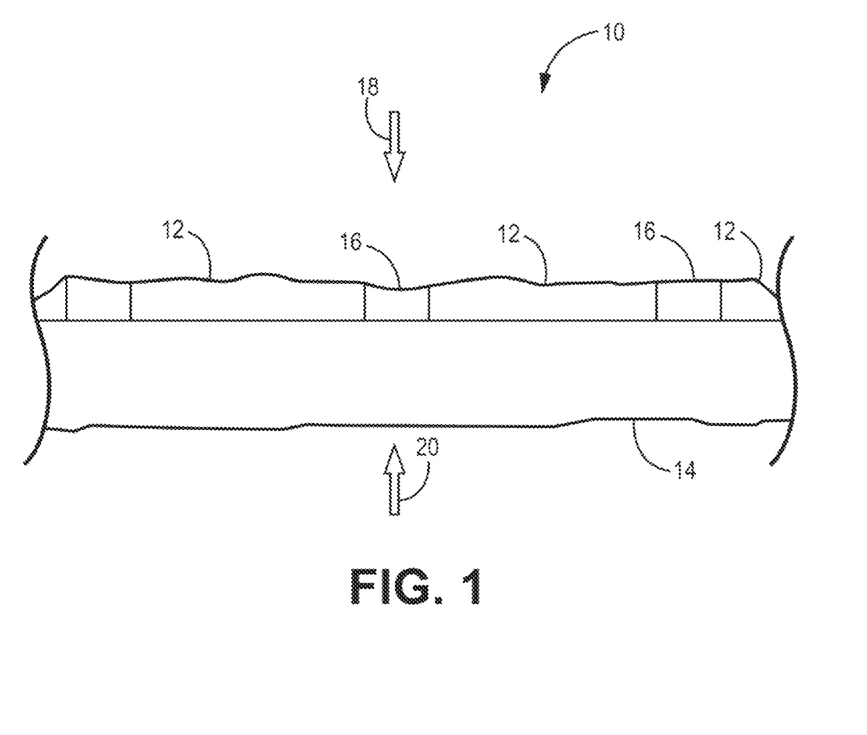
FIG. 1 is a schematic diagram illustrating an example portion of fuel cell system in accordance with the present disclosure.

FIG. 1 is a schematic diagram illustrating an example fuel cell system 10 in accordance with the present disclosure. As shown in FIG. 1, fuel cell system 10 includes a plurality of electrochemical cells 12 ("fuel cells 12") formed on substrate 14. Fuel cells 12 are coupled together in series by primary interconnect 16. Fuel cell system 10 is a segmented-in-series arrangement deposited on a flat porous ceramic tube, although it will be understood that the present disclosure is equally applicable to segmented-in-series arrangements on other substrates, such as a circular porous ceramic tube. In various examples, fuel cell system 10 may be an integrated planar fuel cell system or a tubular fuel cell system.

Fuel cell system 10 includes an oxidant side 18. The oxidant is generally air, but could also be pure oxygen ($O_2$) or other oxidants, including, for example, diluted air which may be formed within the system 10 via one or more air recycle loops. The oxidant may be supplied to fuel cells 12 from oxidant side 18. During fuel cell 12 operation, the oxidant side 18 may define an oxidizing environment. The oxidizing environment may include oxygen partial pressures of 0.1 to 0.9 bar and 0.2 to 0.6 bar and temperatures of 700 to 1000 degrees centigrade and 800-900 degrees centigrade.

A fuel, such as a reformed hydrocarbon fuel or synthesis gas, is supplied to fuel cells 12 from fuel side 20. The fuel be supplied via fuel channels (not shown) in porous substrate 14. Although air (the oxidant) and synthesis gas (the fuel), that may be reformed from a hydrocarbon fuel, may be employed in some examples, it will be understood that electrochemical cells using other oxidants and fuels may be employed without departing from the scope of the present disclosure, such as, for example, pure hydrogen and pure oxygen. In addition, although fuel is supplied to fuel cells 12 via substrate 14, it will be understood that in some examples, the oxidant may be supplied to the electrochemical cells via a porous substrate.

Substrate 14 may comprise a ceramic material having a specific porosity, and may be stable at fuel cell operation conditions and chemically compatible with other fuel cell materials. In some embodiments, substrate 14 may be a surface-modified material, for example, a porous ceramic material having a coating or other surface modification, such as, for example, being configured to prevent or reduce interaction between fuel cell 12 layers and substrate tube.

Figure 2:
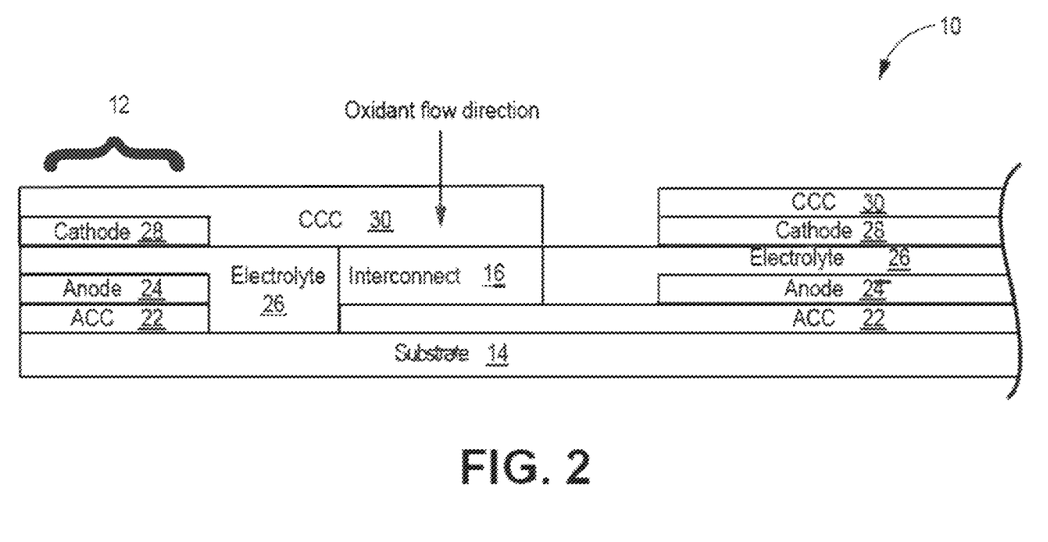
FIG. 2 is a schematic diagram illustrating an example cross section of a portion of a fuel cell system in accordance with the present disclosure.

FIG. 2 is a schematic diagram illustrating an example cross section of fuel cell system 10 in accordance with the present disclosure. Fuel cell system 10 may be formed of a plurality of components printed onto substrate 14. This printing may include a process whereby a woven mesh having openings through which the fuel cell layers are deposited is placed onto substrate 14. The openings of the screen determine the length and width of the printed layers. Screen mesh, wire diameter, ink solids loading and ink rheology may determine the thickness of the printed layers.

Fuel cell system 10 layers include an anode conductive layer 22 (also referred to as an anode current collector or "ACC"), an anode 24, an electrolyte 26, a cathode 28 and a cathode conductive layer 30 (also referred to as a cathode current collector or "CCC"). In one form, electrolyte 26 may be a single layer or may be formed of any number of sub-layers. It will be understood that FIG. 2 is not necessarily to scale. For example, horizontal and vertical dimensions are exaggerated for purposes of clarity of illustration.

In each fuel cell 12, ACC 22 conducts free electrons away from anode 24 and conducts the electrons to the CCC 30 of an adjacent cell via primary interconnect 16. CCC 30 conducts the electrons to cathode 28. Primary interconnect 16 is electrically coupled to anode conductive layer 22 and to cathode conductive layer 30.

For a SOFC, primary interconnect 16 are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may cause degradation of materials and mechanical failure, reduced efficiency of the fuel cell system, or reduced fuel cell life. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

Primary interconnect 16 may be formed of a precious metal, including, for example, Ag, Pd, Au, or Pt, although other materials may be employed without departing from the scope of the present disclosure. For example, in some examples, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt, as well as binary, ternary, or quaternary alloys in the Pt—Pd—Au—Ag family, inclusive of alloys having minor non-precious metal additions, cermets composed of a precious metal, precious metal alloy, and an inert ceramic phase, such as alumina, or ceramic phase with minimum ionic conductivity which will not create significant parasitics, such as YSZ (yttria stabilized zirconia, also known as yttria doped zirconia, wherein yttria doping is 3-8 mol %, preferably 3-5 mol %), ScSZ (scandia stabilized zirconia, wherein scandia doping is 4-10 mol %, preferably 4-6 mol %), doped ceria, and/or conductive ceramics, such as conductive perovskites with A or B-site substitutions or doping to achieve adequate phase stability and/or sufficient conductivity as an interconnect, e.g., including at least one of doped strontium titanate (such as $La_xSr_{1-x}TiO_{3-\delta}$, x=0.1 to 0.3), LSCM ($La_{1-x}Sr_xCr_{1-y}Mn_yO_3$, x=0.1 to 0.3 and y=0.25 to 0.75), doped yttrium chromites (such as $Y_{1-x}Ca_xCrO_{3-\delta}$, x=0.1-0.3) and/or other doped lanthanum chromites (such as $La_{1-x}Ca_xCrO_{3-\delta}$, where x=0.15-0.3), and conductive ceramics, such as doped strontium titanate, doped yttrium chromites, LSCM ($La_{1-x}Sr_xCr_{1-y}Mn_yO_3$), and other doped lanthanum chromites. In one example, primary interconnect 16 may be formed of y(PdxPt1−x)-(1−y)YSZ where x is from 0 to 1 in weight ratio, and preferably x is in the range of 0 to 0.5 for lower hydrogen flux. Y is from 0.35 to 0.80 in volume ratio, and preferably y is in the range of 0.4 to 0.6.

ACC 22 may be an electrode conductive layer formed of a nickel cermet, such as such as Ni—YSZ (e.g., where yttria doping in zirconia is 3-8 mol %), Ni—ScSZ (e.g., where scandia doping is 4-10 mol %, preferably including a second dopant for example 1 mol % ceria for phase stability for a 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site), $La_{1-x}Sr_xMn_yCr_{1-y}O_3$ and/or Mn-based R—P phases of the general formula a $(La_{1-x}Sr_x)_{n+1}Mn_nO_{3n+1}$. Alternatively, it is considered that other materials for anode conductive layer 22 may be employed such as cermets based in part or whole on precious metal, nickel, or both. Precious metals in the cermet may include, for example, Pt, Pd, Au, Ag, and/or alloys thereof. The ceramic phase may include, for example, an inactive, non-electrically conductive phase, including, for example, YSZ, ScSZ and/or one or more other inactive phases. These one or more inactive phases may have a coefficient of thermal expansion (CTE) that helps control the combined CTE of the ACC 22 to match, or better match, the CTE of the substrate 14 and/or electrolyte 26. In some examples, the ceramic phase may include $Al_2O_3$ and/or a spinel such as $NiAl_2O_4$, $MgAl_2O_4$, $MgCr_2O_4$, and $NiCr_2O_4$. In some examples, the ceramic phase may be electrically conductive, e.g., doped lanthanum chromite, doped strontium titanate and/or one or more forms of LaSrMnCrO and/or R—P phases of the general formula $(La_{1-x}Sr_x)_{n+1}Mn_nO_{3n+1}$.

Electrolyte 26 may be made from a ceramic material. In one form, a proton and/or oxygen ion conducting ceramic may be employed. In one form, electrolyte 26 is formed of YSZ, such as 3YSZ and/or 8YSZ. In some examples, electrolyte 26 may be formed of ScSZ, such as 4ScSZ, 6ScSz and/or 10Sc1CeSZ in addition to or in place of YSZ. In some examples, other materials may be employed. For example, it is considered that electrolyte 26 may be made of doped ceria and/or doped lanthanum gallate. In any event, electrolyte 26 is substantially impervious to diffusion there through of the fluids used by fuel cell system 10, e.g., synthesis gas or pure hydrogen as fuel, as well as, e.g., air or $O_2$ as an oxidant, but allows diffusion of oxygen ions or protons.

CCC 30 may be an electrode conductive layer formed of a conductive ceramic, for example, at least one of $LaNi_xFe_{1-x}O_3$ (such as, e.g., $LaNi_{0.6}Fe_{0.4}O_3$), $La_{1-x}Sr_xMnO_3$ (such as $La_{0.75}Sr_{0.25}MnO_3$), $La_{1-x}Sr_xCoO_3$ and/or $Pr_{1-x}Sr_xCoO_3$, such as $Pr_{0.8}Sr_{0.2}CoO_3$. In some examples, CCC 30 may be formed of other materials, e.g., a precious metal cermet, although other materials may be employed without departing from the scope of the present disclosure. The precious metals in the precious metal cermet may include, for example, Pt, Pd, Au, Ag and/or alloys thereof. The ceramic phase may include, for example, YSZ, ScSZ and $Al_2O_3$, or other non-conductive ceramic materials as desired to control thermal expansion.

Any suitable technique may be employed to form fuel cell system 10 of FIGS. 1 and 2. For example, ACC 22 and a portion of electrolyte 26 may be printed directly onto substrate 14, Anode 24 may be printed onto anode conductive layer 22. Some portions of electrolyte 26 may be printed onto anode 24 and other portions of electrolyte 26 may be printed onto ACC 22 and/or substrate 14. Cathode 28 is printed on top of electrolyte 26. Cathode 28 is spaced apart from anode 24 the local thickness of electrolyte layer 26. Portions of CCC 30 are printed onto cathode 28 and onto electrolyte 26. Primary interconnect 16 may be printed on ACC 22. A portion of the CCC 30 may be printed on interconnect 16.

A gap may separate anodes 24 of adjacent fuel cells. Similarly, a gap may separate cathodes 28 of adjacent fuel cells. Each fuel cell 12 is formed by an anode 24 and cathode 28 spaced apart by a portion of the electrolyte 26.

Similarly, ACC 22 (also known as an anode conductor film) and CCC 30 (also known as a cathode conductor film) may have respective gaps between adjacent ACCs 22 and CCCs 30. The terms, "anode conductive layer" and "anode conductor film" may be used interchangeably.

In some examples, ACC 22 has a thickness of approximately 5-15 microns, although other values may be employed without departing from the scope of the present disclosure. For example, the anode conductive layer may have a thickness in the range of approximately 5-50 microns. In some examples, different thicknesses may be used, for example, depending upon the particular material and application.

Anode 24 may have a thickness of approximately 5-20 microns, although other values may be employed without departing from the scope of the present disclosure. In some examples, the anode 24 may have a thickness in the range of approximately 5-40 microns. In some examples, different thicknesses may be used, for example, depending upon the particular anode 24 material and application.

Electrolyte 26 may have a thickness of approximately 5-15 microns with minimum individual sub-layer thicknesses of approximately 5 microns. Other thickness values may be employed without departing from the scope of the present disclosure. For example, the electrolyte 26 may have a thickness in the range of approximately 5-200 microns. In some examples, different thicknesses may be used, for example, depending upon the particular materials and application.

Cathode 28 may have a thickness of approximately 3-30 microns, such as, for example, approximately 5-10 microns. Other values may be employed without departing from the scope of the present disclosure. For example, the cathode 28 may have a thickness in the range of approximately 10-50 microns. In some examples, different thicknesses may be used, for example, depending upon the particular cathode 28 material and application.

CCC 30 has a thickness of approximately 5-100 microns, although other values may be employed without departing from the scope of the present disclosure. For example, the CCC 30 may have a thickness less than or greater than the range of approximately 5-100 microns. In some examples, different thicknesses may be used, for example, depending upon the particular CCC 30 material and application.

Figure 3:
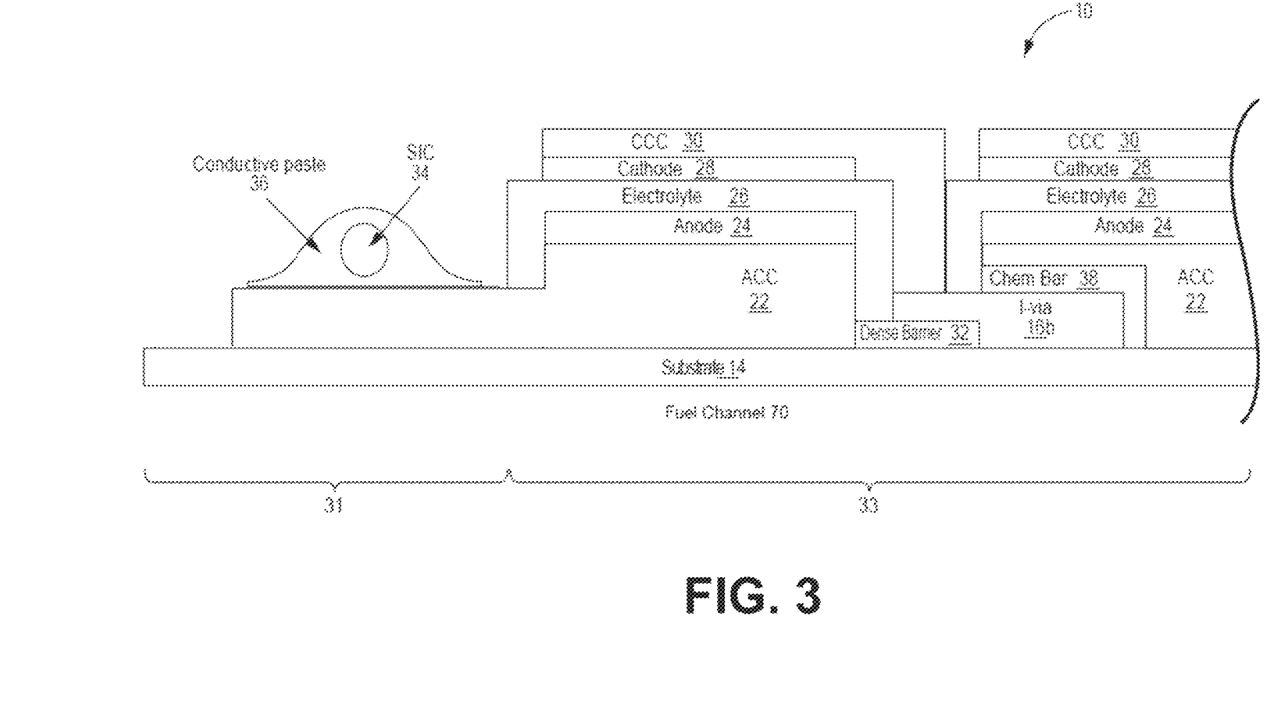
FIG. 3 is a schematic diagram illustrating a fuel cell tube having a secondary interconnect wire in accordance with the present disclosure

FIG. 3 illustrates a fuel cell system 10 having a secondary interconnect ("SIC") wire 34. The fuel cell system 10 has a fuel cell tube that comprises a plurality of fuel cells, each cell comprising an ACC 22, anode 24, electrolyte 26, cathode 28 and CCC 30. The fuel cells may be deposited or printed on a substrate 14 that separates the fuel cells from a fuel channel 70. Adjacent fuel cells may be electrically coupled by a primary interconnect (or "I-Via") 16b. The fuel cell tube may further comprise dense barrier 32, chemical barrier 38, substrate 14. Dense barrier 32 separates at least a portion of the primary interconnect 16 from the substrate 14 and functions to inhibit the flow of fuel or other gasses to the primary interconnect 16. Chemical barrier 38 is disposed between the primary interconnect 16 and the anode 24, ACC 22, or both and functions to inhibit the transfer of material from which the interconnect 16 is composed into the ACC 22, anode 24, or both, and/or the transfer of material from which the ACC 22 is composed, material from which the anode 24 is composed, or both into the interconnect 16. The fuel cell tube may be divided into "active" portions 33 that contain electrochemically active fuel cells during operations and "inactive" portions 31 that do not contain the necessary structure, components, or both to support the fuel cell electrochemical reactions.

The SIC wire 34 may be electrically coupled to, and may be in contact with the ACC 22 or other component that functions to electrically couple the SIC wire 34 to the anode 24 (or cathode 28) of an electrochemically active cell. SIC wire may then be used to couple the electrochemically active fuel cells to fuel cells on the other side of the same tube or to fuel cells on another tube as illustrated in FIG. 4.

Figure 4:
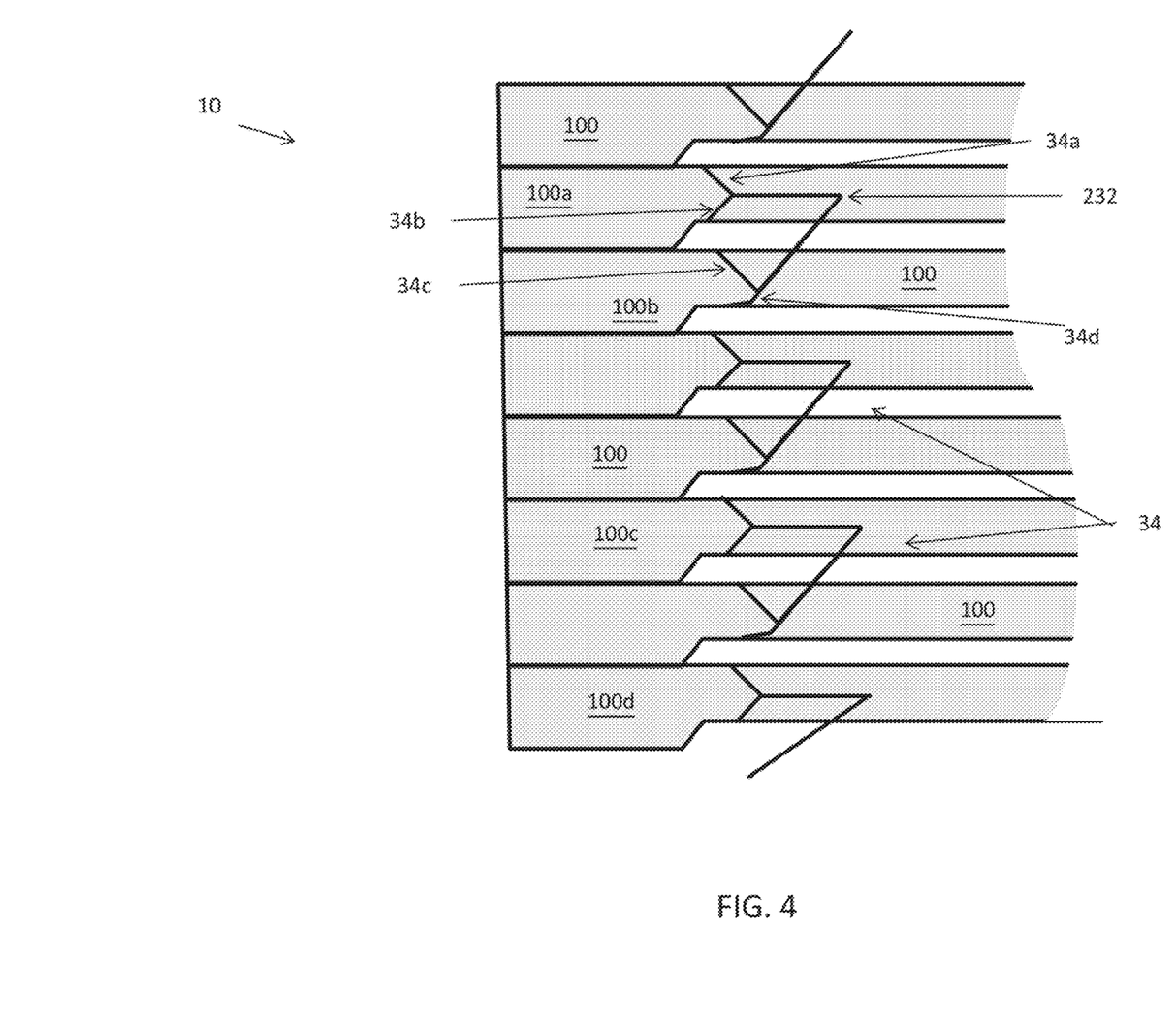
FIG. 4 is a schematic diagram illustrating a plurality of fuel cell tubes electrically coupled by secondary interconnect wires.

FIG. 4 illustrates an elevation view of one end of a plurality of electrically fuel cell tubes 100 arranged in a bundle of fuel cell system 10. A plurality of SICs 34 electrically couple the individual fuel cells (not shown) in the bundle. As shown, wire 34a is coupled to a fuel cell on one side of a fuel cell tube 100a and wire 34b is coupled to a fuel cell on the other side the same fuel cell tube 100a. SICs 34a and 34b may then be electrically coupled to one another, such as, e.g., bonding by spot welding or other technique to electrically couple the fuel cells on the top and bottom surfaces of tube 100a. Similarly, wire 34c is coupled to a fuel cell on one side of an adjacent fuel cell tube 100b, and wire 34d is coupled to a fuel cell on the other side of the same adjacent fuel cell tube 100b. SICs 34c and 34d may then be electrically coupled to one another, such as, e.g., bonding by spot welding or other technique to electrically couple the fuel cells on the top and bottom surfaces of tube 100b. These four SIC wires 34a, 34b, 34c, and 34d may then be bonded, such as, e.g. spot welded, to one another at point 232 in order to electrically couple the pluralities of fuel cells on adjacent fuel cell tubes 100a and 100b in series with one another. Additionally, the fuel cells on one side of any fuel cell tube 100 may be electrically coupled in parallel with the fuel cells on the other side of the same tube 100.

Figure 5A:
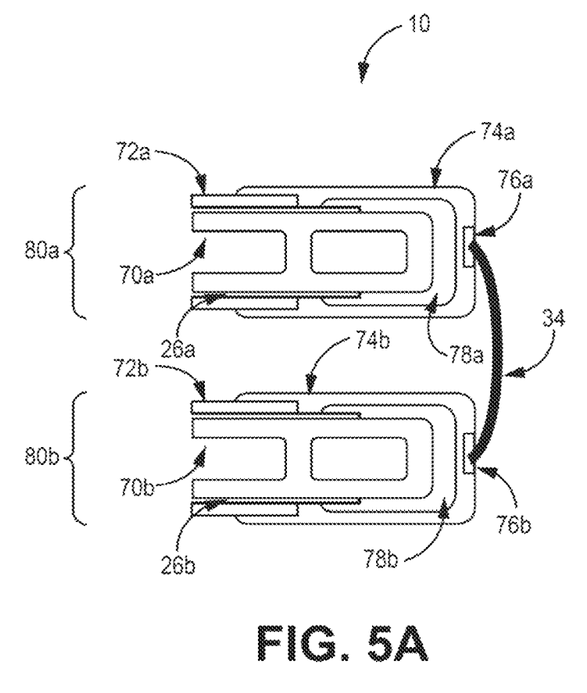
FIGS. 5A-5B are schematic diagrams illustrating example cross sections of a portion of two adjacent fuel cell tubes of a fuel cell system in accordance with the present disclosure.
Figure 5B:
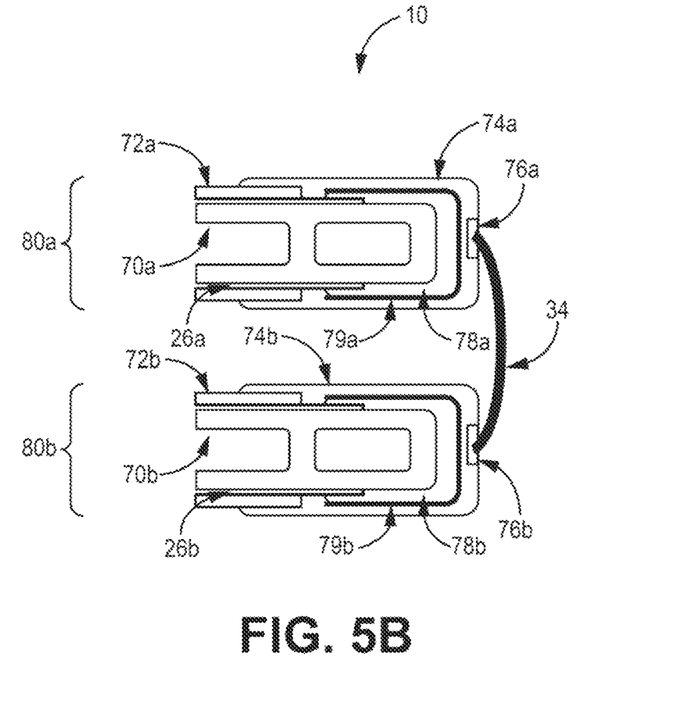

SICs of this design present challenges which can hamper the performance of a fuel cell system. For example, the gap between SIC wires 34 is difficult to control. This gap may be reduced during the handling and assembly of the system, and this reduction may occur at one end of a pair of cell tubes, such, e.g., between 100c and 100d in FIG. 4, that are not electrically coupled at that end. Additionally, fuel cell operations may cause SIC wire 34 movement due to material aging and creep at high temperatures. Smaller gaps between SIC wires may result in arcing or short circuits during operation. Severe arcing or short circuits may result in higher local currents, leading to fuel starvation. In turn, fuel starvation may convert the operating mode of the effected cells leading to oxygen pumping (i.e., generating oxygen) that can cause local burning. The high local temperatures caused by the arcing, short circuits, local burning, or any of these may generate crakes in the porous substrates of the tubes and cause failures in the fuel cell system FIGS. 5A-5B are schematic diagrams illustrating a cross sections of a portion of two adjacent fuel cell tubes of fuel cell system 10 in accordance with some embodiments of the present disclosure. This cross section may be taken at an edge of the tube, wherein the edge may be proximate to a terminal end of an upper fuel cell tube 80a and lower fuel cell tube 80b. As shown in FIGS. 5A-5B, fuel cell tubes 80a and 80b may include a fuel channel 70a and 70b, CCC or secondary interconnect layer 72a and 72b, electrolyte 26a and 26b, conductive ink line 74a and 74b, bonding pad 76a and 76b, secondary interconnect 34 (which may be known as "SIC" or a "SIC wire"), sealing glass 78a and 78b, and insulating layer 79a and 79b.

Sealing glass 78 may inhibit the migration of hydrogen, or another fuel, from fuel channel 70 into secondary interconnect 34. The sealing glass 78 may comprise at least one material selected from the group comprising, glass, glass-ceramic, stabilized zirconia, alumina, La2Zr2O7 pyrochlore, SrZrO3, MgO, Y2O3-ZnO, and B2O3. The sealing glass may comprise glass. In some embodiments, sealing glass 78 may comprise a glass or glass-ceramic that has a CTE matched with substrate tube and dense ceramic manifold (not shown) to which the tube is attached, usually in the range of 10.5 to 12 ppm/C, prefer in the range of 10.8-11.3. The glass-ceramic should be stable during long term operation at 700-1000 C, for example 800-900 C, under both ow and high pO2. Conductive ink line 74, which may also be referred to as a sheet conductor or an ink line trace, may be electrically coupled to CCC or secondary interconnect conductive layer 72 of fuel cells on one or more sides of the same tube, thereby providing an electrical pathway from one side of the fuel cell tube to the other without the use of a SIC wire. Conductive ink line 74 may be applied near the edge of a tube.

Conductive ink line 74 may comprise a conductive ceramic or a cermet and may be applied to a fuel cell tube using an ink-paste dispensing method. In some embodiments the conductive ink line 74 may be applied through a conductive adhesive tape. The conductive ceramic may be LSM, PSM, LNF, LSF, LSCF, LSC etc. The ceramic component of the cermet may comprise conductive ceramic, such as LSM, PSM, LNF, LSF, LSCF, LSC etc, inert ceramic, such as YSZ, CSZ, ScSZ, Al2O3, La2Zr2O7, etc, or glass-ceramic in a 5 to 70 v % of the cermet. In some embodiments glass may comprise 20 to 60 v % of the cermet. In some embodiments, glass may comprise 55 v % of the cermet. The metal component of the cermet may comprise a precious metal such as, e.g., Pd, Ag, Pt, and Au. In some embodiments the metal component cermet may comprise binary or ternary alloys of a precious metal. In some embodiments, the metal component may comprise a noble metal. In some embodiments, the metal component may comprise a nickel metal. The sheet conductor 74 may comprise nickel cermet, such as xNiO-(100-x)YSZ, wherein, 40<x<80 in weight percent, or yNiO-zTiO2-(100-y-z)YSZ, wherein 40<y<80 and 5<z<40 in weight percent. Preferably after reduction, the volume fraction of Ni metal is 30 v % or higher.

After firing, the thickness of the sheet conductor 74 may be around 20 to 100 micrometers thick. Depending on the conductivity of the cermet, the sheet conductor 74 thickness can be in the range of 10 to 200 micrometers. The conductivity can be in the range of 500 to 10,000 S/cm, preferred to be higher than 4,000 S/cm.

In some examples, conductive ink line 74 may be formed by extending a CCC or secondary interconnect conductive layer 72. In some examples, conductive ink line 74 may be configured to spread the current travelling from secondary interconnect 34 into conductive ink line 74. In some examples, conductive ink line 74 may be configured to concentrate the current travelling from conductive ink line 74 into secondary interconnect 34.

In some embodiments, secondary interconnect wire 34 may have a diameter of about 0.05 to 0.3 mm, preferably 0.1 to 0.2 mm.

In some examples, as shown in FIG. 5A, conductive ink line 74 may be disposed directly on sealing glass 78. In some examples, as shown in FIG. 5B, electrically insulating layer 79 may be disposed between conductive ink line 74 and sealing glass 78. The insulating layer 79 may be a non-conductive ceramic, such as stabilized zirconia (YSZ, or ScSZ), alumina, La2Zr2O7, MgAl2O4, and can be dense or porous. Preferably, the insulating layer 79 is not fully dense. The insulating layer 79 may prevent the sealing glass from evaporating and contaminating the cathode material, thereby improving the long-term durability of conductive ink line 74. In some examples, insulating layer 79 may include multiple layers. The insulating material should be stable during operation at high temperatures with no interaction with sealing glass and conductive ink line, higher electrical resistance. In some examples, additional layers may be disposed directly on conductive ink line 74.

Electrolyte 26 may be configured to inhibit migration of hydrogen, or another fuel, from fuel channel 70 into secondary interconnect 34.

Bonding pad 76 may electrically couple conductive ink line 74 with secondary interconnect 34. In some examples, bonding pad 76 and secondary interconnect wire 34 may be formed of a precious metal, including, for example, Pd or Pd alloy with a dopant that is mechanically and chemically stable in the oxidant environment of a fuel cell such as, for example, a Group IB metal (e.g., Cu, Ag, or Au) or a Group VII metal (e.g., Pd or Pt). In some examples, bonding pad 76 may be formed of other precious metals or precious metal alloys, such as, for example, Ag—Pd, Ag—Au, Ag—Pt, Au—Pd, Au—Pt, Pt—Pd, Ag—Au—Pd, Ag—Au—Pt, Ag—Au—Pd—Pt, as well as binary, ternary, or quaternary alloys in the Pt—Pd—Au—Ag family, inclusive of alloys having minor non-precious metal additions, or cermets composed of a precious metal. The secondary interconnect 34 may further comprise Fecralloy or an alumina forming alloy.

In some examples, bonding pad 76 may be disposed on a small portion of conductive ink line 74. For example, bonding pad 76 may have a surface area between 0.1 square millimeters ($mm^2$) to 10 $mm^2$, for example, 0.5 to 2 $mm^2$. In some examples, bonding pad 76 may have a detailed geometric shape. In some examples, bonding pad 76 may be a plurality of bonding pads. In some examples, bonding pad 76 may be a strip, for example, extending the length of conductive ink line 74. In some examples, the geometry of bonding pad 76 may be selected to concentrate current travelling from conductive ink line 74 to secondary interconnect 34. In some examples, the geometry of bonding pad 76 may be selected to spread current travelling from secondary interconnect 34 to conductive ink line 74. In some examples, the geometry of bonding pad 76 may be selected to prevent current density building up at the interface of bonding pad 76 and secondary interconnect 34. In some examples, the geometry of bonding pad 76 may be selected to prevent current density building up at the interface of bonding pad 76 and conductive ink line 74.

In the examples of FIGS. 5A and 5B, secondary interconnect wire 34 is electrically coupled to bonding pad 76a, conductive ink line 74a, cathode conductive layer or secondary interconnect conductive layer 72a. Also, secondary interconnect 34 is electrically coupled to bonding pad 76b, conductive ink line 74*b*, cathode conductive layer or secondary interconnect conductive layer 72*b*. In this way, secondary interconnect 34 electrically couples upper fuel cell tube 80*a* to lower fuel cell tube 80*b*. In some examples, upper fuel cell tube 80*a* and lower fuel cell tube 80*b* may be electrically coupled in series. For example, cathode conductive layer or secondary interconnect layer 72*a* may be adjacent and electrically coupled to a cathode of upper fuel cell tube 80*a* and cathode conductive layer or secondary interconnect layer 72*b* may be adjacent and electrically coupled to an anode of lower fuel cell tube 80*b*. In some examples, upper fuel cell tube 80*a* and lower fuel cell tube 80*b* may be electrically coupled in parallel. For example, cathode conductive layer or secondary interconnect layer 72*a* may be adjacent and electrically coupled to a cathode of upper fuel cell tube 80*a* and cathode conductive layer or secondary interconnect layer 72*b* may be adjacent and electrically coupled to a cathode of lower fuel cell tube 80*b*.

Figure 6:
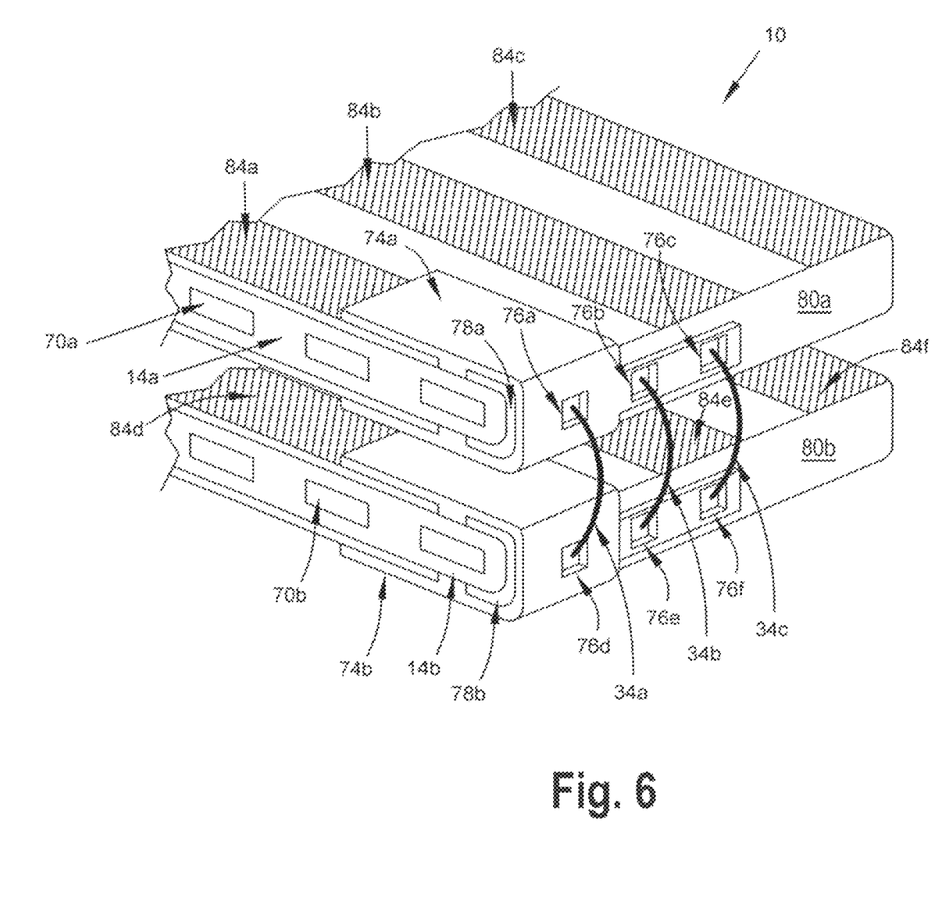
FIG. 6 is a schematic diagram illustrating an example perspective view of a portion of two fuel cell tubes in accordance with the present disclosure.

FIG. 6 is a schematic diagram illustrating a perspective view of a portion of fuel cell tubes of a fuel cell system 10 in accordance some embodiments of the present disclosure. In the example of FIG. 6, each fuel cell tube 80*a* and 80*b* may include conductive ink line 74*a*-74*b*, bonding pad 76*a*-76*f*, fuel cells 84*a* to 84*f* and other components as described above.

Each adjacent fuel cell tube may be electrically coupled. For example, as shown in FIG. 6, secondary interconnect 34*a* may be electrically coupled to bonding pad 76*a* on conductive ink line 74*a* on fuel cell tube 80*a* and bonding pad 76*d* on conductive ink line 74*b* on fuel cell tube 80*b*. Similarly, fuel cell tubes 80*a* and 80*b*, may be electrically coupled via secondary interconnects 34*b* and 34*c* that are electrically coupled to bonding pad pairs 76*b*-76*e* and 76*c*-76*f*, respectively. In this way, for example, two adjacent fuel cell tubes may be electrically coupled in parallel or in series.

While the bonding pads 76*a*-76*f* are illustrated as being set within the sheet conductive ink lines 74 such that the pad is positioned below the surface of the ink lines 74, it should be understood that the bonding pads may be adhered or bonded to the outer surface of the ink lines 74, or otherwise extend away from the outer surface of the ink lines 74.

Each fuel cell tube may comprise a substrate having a first and second end (second end not shown), and a pair of generally planar opposing major surfaces extending between the ends. The extension may be continuous in that there is no major disruption in the surface between the ends. The ink traces 74*a* and 74*b* may be an electrical conductor that provides an electrical pathway from a fuel cell disposed on one of the major surfaces proximate a first end of the tube to a location on the other of the major surfaces proximate to the same end and may comprise the materials described above. The second end (not shown) may also have an ink trace electrical conductor performing a similar function.

The electrical conductors 74*a* and 74*b* may have a portion that extends axially along an edge of the substrate tube. The edge of the tube may separate the major surfaces of that tube. One or more of the bonding pads 76*a*-76*f* may be disposed on this axially extending portion.

Though not shown in FIG. 6, it is understood that fuel cell tubes 80*a* and 80*b* may be connected in series or parallel.

Figure 7:
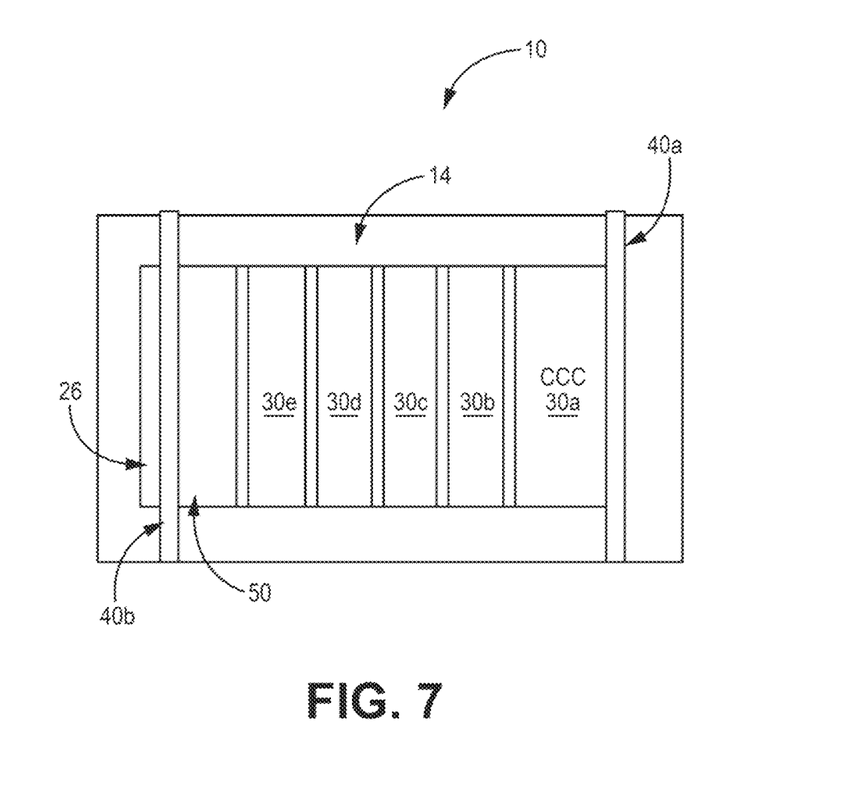
FIG. 7 is a schematic diagram illustrating a top view of a fuel cell system in accordance with the present disclosure.

FIG. 7 is a schematic diagram illustrating an example top view of a portion of a fuel cell system 10 in accordance with the present disclosure. As shown in FIG. 7, fuel system 10 may include substrate 14, electrolyte 26, cathode conductive layer 30, secondary interconnect conductive layer 40, and fuel cell. In some examples, secondary interconnect conductive layer 40*a* may be disposed on a cathode-side and secondary interconnect conductive layer 40*b* may be disposed on an anode-side. For example, on the anode-side, secondary interconnect conductive layer 40*b* may be disposed on electrochemically inactive cell. Whereas on the cathode-side, for example, secondary interconnect conductive layer 40*a* may be disposed on cathode conductive layer 30*a*.

In some examples, secondary interconnect conductive layer 40*a*, 40*b* may be disposed on an electrochemically active cell in accordance with, for example, the examples as described above.

In some examples, secondary interconnect conductive layer 40 may extend over the boundary defined cathode conductive layer 30 or fuel cell and may extend proximate to a boundary defined by substrate 14 (i.e. the fuel cell tube edge). For example, the cathode-side secondary interconnect conductive layer 40*a* may extend over the boundary defined by cathode conductive layer 30*a* and may extend proximate to a boundary defined by substrate 14. Similarly, for example, anode-side secondary interconnect conductive layer 40*b* extend over the boundary defined by fuel cell and may extend proximate to a boundary defined by substrate 14.

Figure 8:
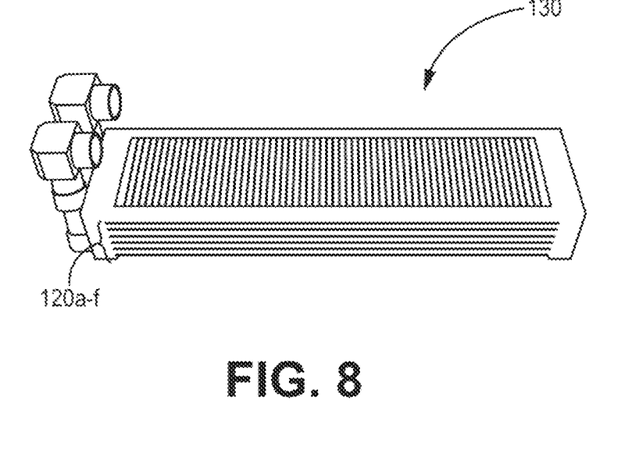
FIG. 8 is a schematic diagram illustrating an example of a fuel cell bundle of a fuel cell system in accordance with the present disclosure.

FIG. 8 is a schematic diagram illustrating an example of a fuel cell bundle 130 of a fuel cell system in accordance with the present disclosure. As shown in FIG. 8, fuel cell bundle 130 may include six fuel cell tubes 120*a*-*f*. In some examples, fuel cell bundle 130 may include less than six fuel cell tubes 120. In some examples, fuel cell bundle 130 may include more than six fuel cell tubes 120. In some examples, as shown in FIG. 8, fuel cell tubes 120 may be stacked, or otherwise disposed adjacent one another, and electrically coupled to form fuel cell bundle 130. In some examples, fuel cell tubes 120 may be disposed in other orientations for form fuel cell bundle 130. In some examples, fuel cell tubes 120 may be electrically coupled to a bus bar, or otherwise electrically coupled in parallel.

Figure 9:
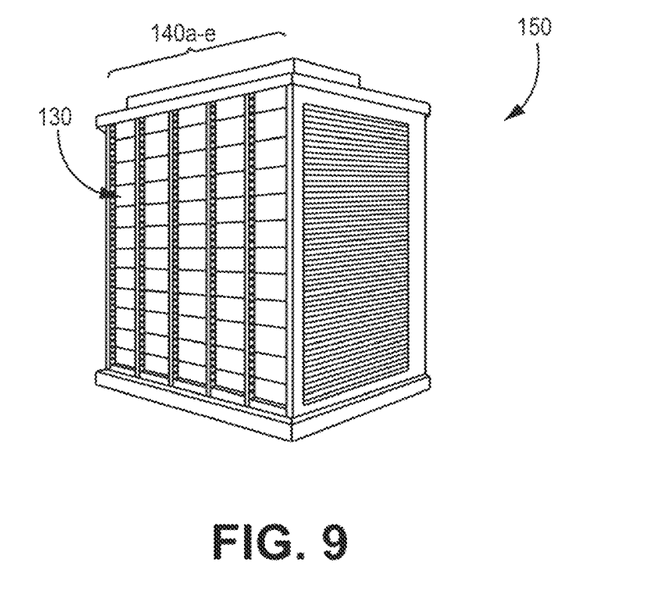
FIG. 9 is a schematic diagram illustrating an example of a fuel cell block of a fuel cell system in accordance with the present disclosure.

FIG. 9 is a schematic diagram illustrating an example of a fuel cell block 150 of a fuel cell system in accordance with the present disclosure. As shown in FIG. 9, fuel cell block 150 may include five fuel cell strips 140*a*-*e*, where each fuel cell strip 140*a*-*e* may include twelve fuel cell bundles 130. In some examples, fuel cell strips 140 may include less than twelve fuel cell bundles 130. In some examples, fuel cell strips 140 may include more than twelve fuel cell bundles 130. In some examples, fuel cell block 150 may include less than five fuel cell strips 140. In some examples, fuel cell block 150 may include more than five fuel cell strips 140. In some examples, as shown in FIG. 9, fuel cell bundles 130 may be stacked, or otherwise disposed adjacent one another, and electrically coupled to form fuel cell strips 140. In some examples, fuel cell bundles 130 may be disposed in other orientations to form fuel cell strips 140. In some examples, as shown in FIG. 9, fuel cell strips 140 may be disposed adjacent one another and electrically coupled to form fuel cell block 150. In some examples, fuel cell strips 140 may be disposed on other orientations to form fuel cell block 150. In some examples, fuel cell tubes 120 may be electrically coupled to a bus bar, or otherwise electrically coupled in parallel. In some examples, fuel cell bundles 130 may be electrically coupled to a bus bar, or otherwise electrically coupled in parallel. In some examples, fuel cell strips 140 may be electrically coupled to a bus bar, or otherwise electrically coupled in parallel.

Figure 10:
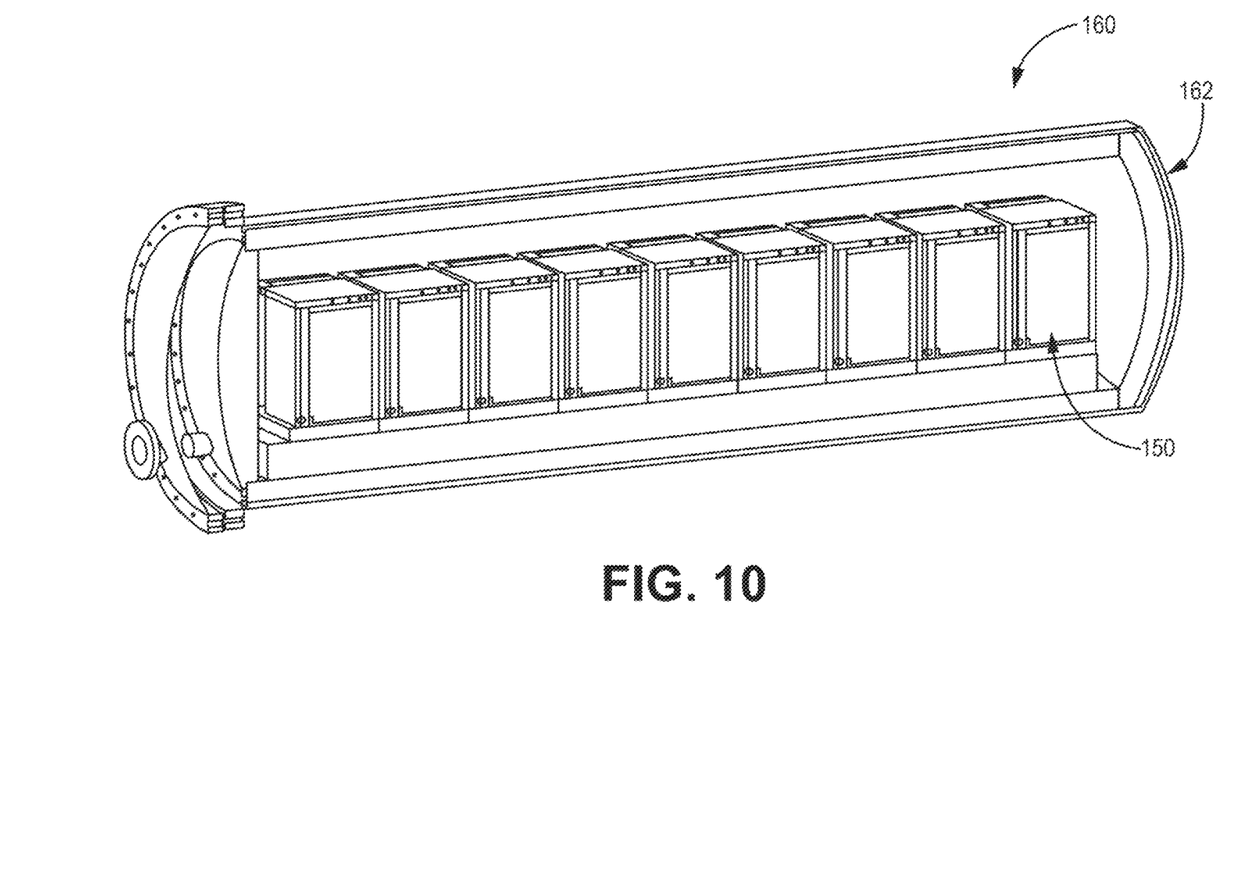
FIG. 10 is a schematic diagram illustrating an example of a fuel cell system in accordance with the present disclosure.

FIG. 10 is a schematic diagram illustrating an example of a fuel cell system in accordance with the present disclosure. As shown in FIG. 10, a fuel cell generator module 160 may include nine fuel cell blocks 150. In some examples, fuel cell generator module 160 may include less than nine fuel cell blocks 150. In some examples, fuel cell generator module 160 may include more than nine fuel cell blocks. In some examples, as shown in FIG. 10, fuel cell blocks 150 may be disposed adjacent one another and electrically coupled to form fuel cell generator module 160. In some examples, fuel cell blocks 150 may be disposed in other orientations and electrically coupled to form fuel cell generator module 160. In some examples, as shown in FIG. 10, fuel cell module 160 may include fuel cell module vessel 162. In some examples, fuel cell blocks 150 may be electrically coupled to a bus bar, or otherwise electrically coupled in parallel.

Various examples of the present disclosure have been described. These and other examples are within the scope of the following claims.

I claim:

1. A segmented-in-series solid oxide fuel cell system comprising:
    a fuel cell tube comprising:
    a substrate having a first and a second end and a pair of generally planar opposing major surfaces extending between said ends;
    a plurality of fuel cells disposed on one of said major surfaces, said fuel cells being electrically coupled in series; and
    a first sheet conductor providing an electrical path from a location on one of said major surfaces to a location on the other of said major surfaces proximate the first end of said substrate, said first sheet conductor being electrically coupled to said plurality of fuel cells,
    wherein said first fuel cell tube comprises a plurality of fuel cells disposed on the other of said major surfaces, said plurality of fuel cells being electrically coupled in series and being electrically coupled to said first sheet conductor, and
    wherein said plurality of fuel cells disposed on one of said major surfaces of said first fuel cell tube are electrically coupled in parallel with said plurality of fuel cells disposed on the other of said major surfaces by said first sheet conductor.

2. The fuel cell system of claim 1 further comprising a secondary interconnect electrically coupled to said first sheet conductor.

3. The fuel cell system of claim 1 further comprising a second sheet conductor providing an electrical path from a location on one of said major surfaces to a location on the other of said major surfaces proximate the second end of said substrate, said second sheet conductor being electrically coupled to said plurality of fuel cells.

4. The fuel cell system of claim 3 wherein said fuel cell tube comprises a plurality of fuel cells disposed on the other of said major surfaces, said plurality of fuel cells being electrically coupled in series and being electrically coupled to said second sheet conductor.

5. A fuel cell system comprising:
    a plurality of fuel cell tubes, each of said tubes comprising:
    a first end and a second end;
    a first surface and a second surface, each of said first and second surfaces extending continuously between said first and second ends;
    a plurality of fuel cells disposed on the first and second surfaces, wherein said fuels cells disposed on said first surface are electrically coupled in series to each other by one or more primary interconnects, and said fuel cells disposed on said second surface are electrically coupled in series to each other by one or more primary interconnects;
    a first sheet conductor electrically coupling the fuel cells disposed on the first surface to the fuel cells disposed on the second surface proximate the first end; and
    a second sheet conductor electrically coupling the fuel cells disposed on the first surface to the fuel cells disposed on the second surface proximate the second end,
    wherein said first and second sheet conductors are arranged such that the fuel cells disposed on the first surface are electrically coupled in parallel with the fuel cells disposed on the second surface.

6. The fuel cell system of claim 5, wherein said sheet conductor comprises cermet.

7. The fuel cell system of claim 6, wherein said ceramic component of said cermet comprises glass-ceramic.

8. The fuel cell system of claim 7, wherein said glass is 5 to 70 v % of said cermet.

9. The fuel cell system of claim 8, wherein said glass is 20 to 60 v % of said cermet.

10. The fuel cell system of claim 9, wherein said glass is 55 v % of said cermet.

11. The fuel cell system of claim 6, wherein said metal component of said cermet comprises a precious metal selected from the group consisting of Pd, Ag, Pt, and Au.

12. The fuel cell system of claim 11, wherein said metal component of said cermet further comprises a binary or ternary alloy.

13. The fuel cell system of claim 6, wherein said metal component of said cermet comprises a noble metal.

14. The fuel cell system of claim 6, wherein said cermet comprises xNiO-(100−x)YSZ, wherein, 40<x<80 in weight percent.

15. The fuel cell system of claim 6, wherein said cermet comprises yNiO-zTiO$_2$-(100−y−z)YSZ, wherein 40<y<80 and 5<z<40 weight percent.

16. The fuel cell system of claim 5, wherein at least one of said plurality of fuel cell tubes further comprises:
    a sealing material disposed proximate to at least one of said first and second ends.

17. The fuel cell system of claim 16, wherein said sealing material is disposed between said first or second sheet conductor and said substrate of said at least one of said tubes.

18. The fuel cell system of claim 16, wherein said sealing material comprises at least one material selected from the group comprising, glass, glass-ceramic, stabilized zirconia, alumina, La$_2$Zr$_2$O$_7$ pyrochlore and SrZrO$_3$.

* * * * *